(12) United States Patent
Chen et al.

(10) Patent No.: US 8,531,165 B2
(45) Date of Patent: Sep. 10, 2013

(54) SINGLE-INDUCTOR MULTIPLE-OUTPUT POWER CONVERTER

(75) Inventors: Ke-Horng Chen, Banqiao (TW); Ming-Hsin Huang, Baoshan Township, Hsinchu County (TW)

(73) Assignee: Richtek Technology Corp., Hsinchu (TW)

( * ) Notice: Subject to any disclaimer, the term of this patent is extended or adjusted under 35 U.S.C. 154(b) by 361 days.

(21) Appl. No.: 12/720,030

(22) Filed: Mar. 9, 2010

(65) Prior Publication Data

US 2010/0231186 A1    Sep. 16, 2010

(30) Foreign Application Priority Data

Mar. 13, 2009    (TW) .............................. 98108284 A

(51) Int. Cl.
*G05F 1/40*    (2006.01)
(52) U.S. Cl.
USPC ....................................................... 323/268

(58) Field of Classification Search
USPC .......................... 323/209–211, 267, 268, 282
See application file for complete search history.

(56) References Cited

U.S. PATENT DOCUMENTS

| 6,894,461 | B1 * | 5/2005 | Hack et al. ..................... 323/205 |
| 7,768,241 | B2 * | 8/2010 | Breuer et al. .................. 323/208 |

* cited by examiner

*Primary Examiner* — Adolf Berhane
(74) *Attorney, Agent, or Firm* — Muncy, Geissler, Olds & Lowe, LLP

(57) ABSTRACT

A single-inductor multiple-output power converter includes an inductor having a first terminal and a second terminal. The first terminal of the inductor is coupled to a power input terminal, and the second terminal of the inductor is switched to either of the first terminal of the inductor, multiple power output terminals, and a ground terminal. By switching the second terminal of the inductor between the first terminal of the inductor, the power output terminals, and the ground terminal, the power converter may provide multiple output voltages at the power output terminals respectively, in a less loss and thereby higher efficiency manner.

7 Claims, 9 Drawing Sheets

SINGLE-INDUCTOR MULTIPLE-OUTPUT POWER CONVERTER

FIELD OF THE INVENTION

The present invention is related generally to a power converter and, more particularly, to a single-inductor multiple-output power (SIMO) converter.

BACKGROUND OF THE INVENTION

With technology advancement, electronic products are designed to provide more and more functions and as a result, a single power supply is barely sufficient for some electronic products. Consequently, there is a trend for a power converter to provide multiple supply voltages. FIG. 1 is a circuit diagram of a conventional single-inductor dual-output (SIDO) power converter 10 for providing two supply voltages, which includes a switch SW1 coupled between a power input terminal 12 and an inductor L, two switches SW2 and SW3 coupled between a ground terminal GND and two terminals of the inductor L respectively, and two switches SW4 and SW5 coupled between the inductor L and two power output terminals 14 and 16 respectively.

FIG. 2 is a diagram to illustrate a control method for the power converter 10 of FIG. 1, in which waveform 18 represents an inductor current IL in the inductor L of the power converter 10. Assuming that the power output terminals 14 and 16 of the power converter 10 provide buck output and boost output respectively, the control method begins by turning on the switches SW1 and SW4 to establish a power path P1 and as a result, the power source VIN supplies power to the power output terminal 14 via the power path P1 and charges the inductor L simultaneously. The inductor current IL increases at a slope equal to (VIN−VOA)L, as show by the waveform 18, where VOA is the output voltage at the power output terminal 14. When the output voltage VOA reaches a preset value, the switch SW1 is turned off and the switch SW2 is turned on, thereby disconnecting the power input terminal VIN from the inductor L and establishing a power path P2, by which the inductor L supplies power to the power output terminal 14 to maintain a stable output current and in consequence, the inductor current IL decreases at a slope equal to −VOA/L. When the inductor current IL falls down to a preset level IDC, the switch SW4 is turned off and the switch SW3 is turned on to establish a power path P5. In this case, the unreleased energy in the inductor L will generate a freewheeling current in the inductor L. Following that, the switch SW2 is turned off and the switch SW1 is turned on to restore the connection with the power input terminal VIN and thus establish a power path P3, by which the inductor L is recharged and thereby the inductor current IL increases at a slope equal to VIN/L. When the inductor current IL increases to a preset level IBT, the switch SW3 is turned off and the switch SW5 is turned on, thus establishing a power path P4 to supply power to the power output terminal 16. Hence, the inductor current IL decreases at a slope equal to (VIN−VOB)/L, where VOB is the output voltage at the power output terminal 16. As soon as the output voltage VOB reaches a preset value, the switches SW1 and SW5 are turned off and the switches SW2 and SW3 are turned on to establish the power path P5 to preserve the unreleased energy in the inductor L.

As shown in FIG. 1, the conventional SIDO power converter 10 requires five switches SW1-SW5 to generate two output voltages VOA and VOB, and each of the power paths P1-P5 has two switches for power delivery therethrough, resulting in greater conduction loss. In addition, each switch needs a driver to drive and the switching loss and gate drive loss resulted respectively from the switches and the drivers cannot be ignored.

Therefore, it is desired a SIMO power converter with reduced conduction loss, switching loss, and gate drive loss.

SUMMARY OF THE INVENTION

An object of the present invention is to provide a SIMO power converter with fewer switches and less cost.

Another object of the present invention is to provide a SIMO power converter with reduced conduction loss, switching loss, and gate drive loss.

According to the present invention, a single-inductor multiple-output power converter includes an inductor having a first terminal coupled to a power input terminal, and a second terminal switched between the power input terminal, multiple power output terminals, and a ground terminal. The second terminal of the inductor is coupled to only one of the aforesaid terminals at any time so that there is only one switch in each power path, and in consequence the power converter has increased efficiency.

BRIEF DESCRIPTION OF THE DRAWINGS

These and other objects, features and advantages of the present invention will become apparent to those skilled in the art upon consideration of the following description of the preferred embodiments according to the present invention taken in conjunction with the accompanying drawings, in which.

DETAIL DESCRIPTION OF THE INVENTION

Figure 1:
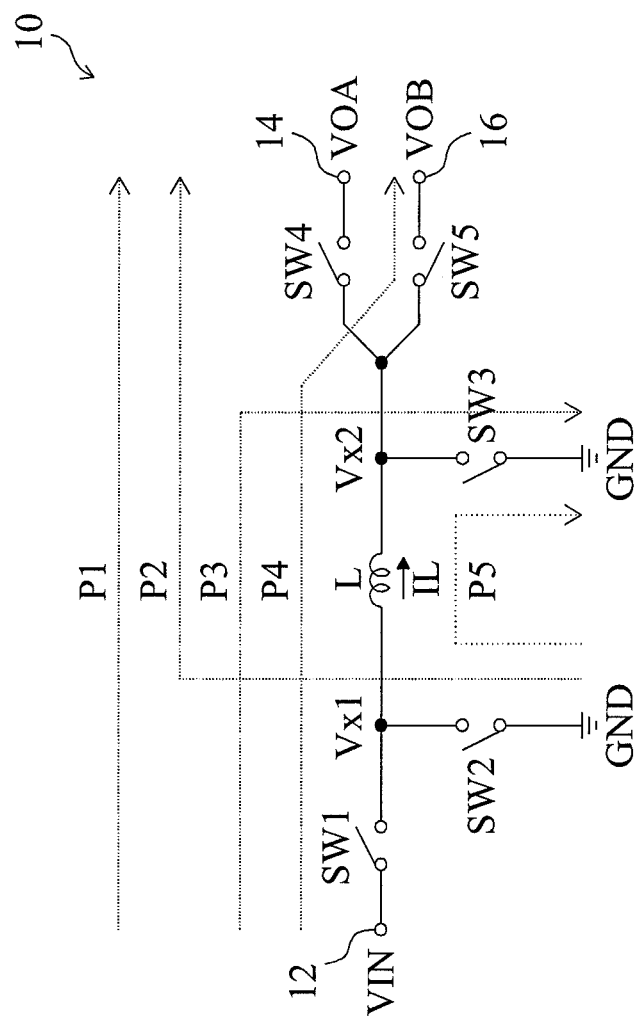
FIG. 1 is a circuit diagram of a conventional SIDO power converter.
Figure 2:
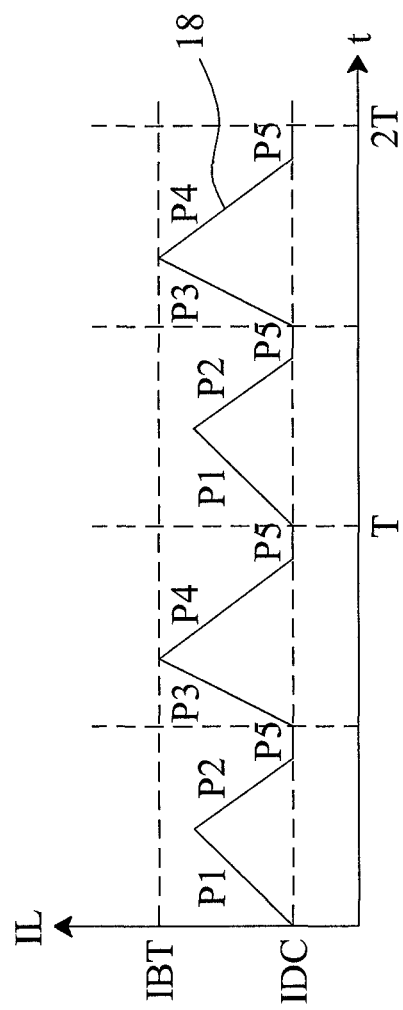
FIG. 2 is a diagram to illustrate a control method for the power converter of FIG. 1.
Figure 3:
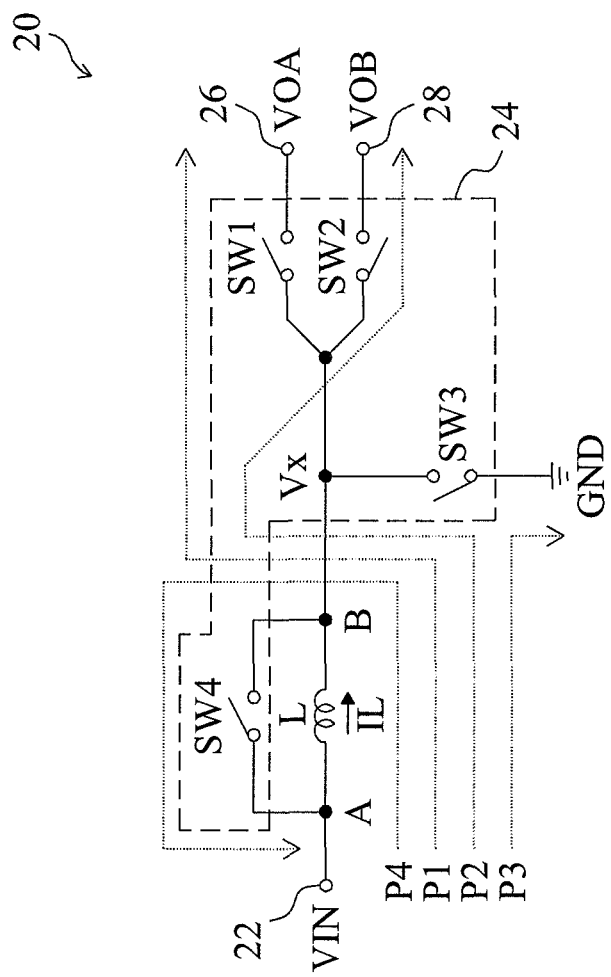
FIG. 3 is a circuit diagram of a SIDO power converter according to the present invention.

According to the present invention, as shown in FIG. 3, a SIDO power converter 20 includes an inductor L having a first terminal A coupled to a power input terminal 22, and a switching circuit 24 operative to switch a second terminal B of the inductor L to either of the power input terminal 22, two power output terminals 26 and 28, and a ground terminal GND. The switching circuit 24 includes a switch SW1 coupled between the second terminal B and the power output terminal 26, a switch SW2 coupled between the second terminal B and the power output terminal 28, a switch SW3 coupled between the second terminal B and the ground terminal GND, and a switch SW4 coupled between the first terminal A and the second terminal B. A power path P1 is established when the second terminal B is switched to the power output terminal 26. A power path P2 is established when the second terminal B is switched to the power output terminal 28. A power path P3 is established when the second terminal B is switched to the ground terminal GND. A power path P4 is established when the second terminal B is switched to the first terminal A. The SIDO power converter 20 uses only four switches SW1-SW4, one less than in the conventional SIDO power converter 10 shown in FIG. 1, and in consequence requires fewer drivers for driving the switches SW1-SW4, also one less than that of the conventional SIDO power converter 10 shown in FIG. 1. Moreover, each of the power paths P1-P4 has only one switch and thus will have less conduction loss and switching loss as well as gate drive loss. Since the SIDO power converter 20 includes fewer switches and drivers, its system complexity, chip area, and production cost are reduced.

Figure 4:
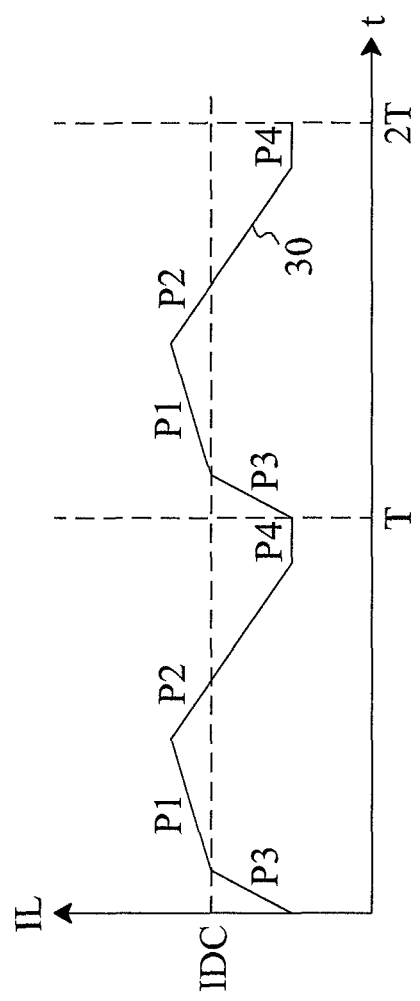
FIG. 4 is a diagram to illustrate a first control method according to the present invention, for the power converter of FIG. 3 to provide a buck output and a boost output.

The power output terminals 26 and 28 of the SIDO power converter 20 can provide a buck output and a boost output, respectively, or both provide boost outputs. FIG. 4 is a diagram to illustrate a control method for the power output terminals 26 and 28 of the SIDO power converter 20 to provide a buck output and a boost output, respectively, in which waveform 30 represents an inductor current IL. At first, the switch SW3 is turned on to couple the second terminal B to the ground terminal GND, so as to establish the power path P3 and thereby charge the inductor L. As a result, the inductor current IL increases at a slope equal to VIN/L. When the inductor current IL increases to a preset level IDC, the switch SW3 is turned off and the switch SW1 is turned on. Thus, the second terminal B is switched to the power output terminal 26 to establish the power path P1, by which power is delivered to the power output terminal 26. At this time, since the output voltage VOA at the power output terminal 26 is lower than the input voltage VIN, the inductor current IL continues to increase but at a slope equal to (VIN−VOA)/L. When the output voltage VOA reaches a preset value, the switch SW1 is turned off and the switch SW2 is turned on, so that the second terminal B is switched to the power output terminal 28, and the power path P2 is established, by which power is delivered to the power output terminal 28, and the inductor current IL decreases at a slope equal to (VOB−VIN)/L, where VOB is the output voltage at the power output terminal 28. When the output voltage VOB increases to a preset value, the switch SW2 is turned off and the switch SW4 is turned on, thereby switching the second terminal B to the first terminal A and establishing the path P4. In consequence, the inductor L remains the inductor current IL at a freewheeling current. Till now, a cycle is completed. This mode operates with an average current mode control, and with the level IDC as a center, the inductor current IL will follow the load variation to vary.

Figure 5:
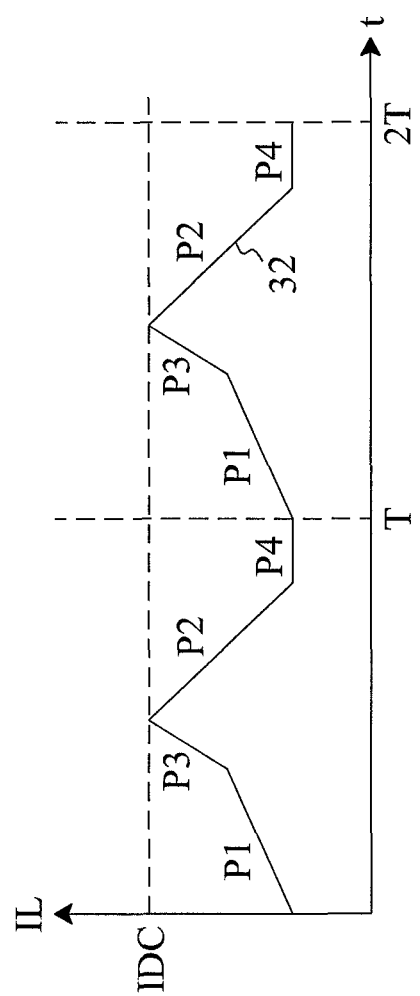
FIG. 5 is a diagram to illustrate a second control method according to the present invention, for the power converter of FIG. 3 to provide a buck output and a boost output.

FIG. 5 is a diagram to illustrate another control method for the power output terminals 26 and 28 of the SIDO power converter 20 to provide a buck output and a boost output, respectively, in which waveform 32 represents an inductor current IL. At first, the switch SW1 is turned on to couple the second terminal B to the power output terminal 26, thus establishing the power path P1 for power delivery to the power output terminal 26. Since the output voltage VOA at the power output terminal 26 is lower than the input voltage VIN, the inductor current IL increases at a slope equal to (VIN−VOA)/L. When the output voltage VOA increases to a preset value, the switch SW1 is turned off and the switch SW3 is turned on so that the second terminal B is switched to the ground terminal GND to establish the power path P3 to charge the inductor L with the inductor current IL increasing at a slope equal to VIN/L. When the inductor current IL reaches the level IDC, the switch SW3 is turned off and the switch SW2 is turned on, thus coupling the second terminal B to the power output terminal 28 and establishing the power path P2. At this time, power is delivered to the power output terminal 28 via the path P2, and the inductor current IL decreases at a slope equal to (VOB−VIN)/L. When the output voltage VOB at the power output terminal 28 increases to a preset value, the switch SW2 is turned off and the switch SW4 is turned on. Thus, the second terminal B is switched to the first terminal A to establish the power path P4 so that the inductor current IL becomes a freewheeling current remained in the inductor L. Till now a cycle is completed. This mode operates with a peak current mode control, and with the level IDC as an upper limit of the inductor current IL, it will change to boost output for power release when the inductor current IL exceeds the level IDC which can be increased or decreased according to different loadings.

Figure 6:
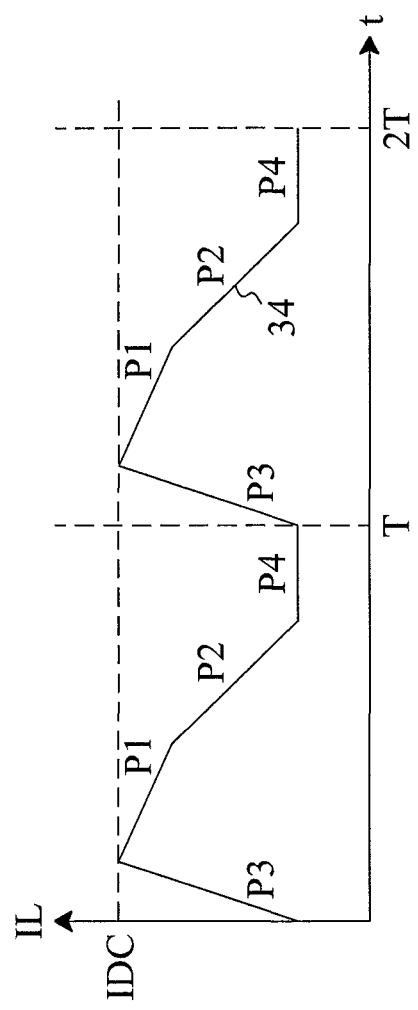
FIG. 6 is a diagram to illustrate a first control method according to the present invention, for the power converter of FIG. 3 to provide two boost outputs.

FIG. 6 is a diagram to illustrate a control method for the power outputs 26 and 28 of the SIDO power converter 20 both to provide two boost outputs, in which waveform 34 represents an inductor current IL. At first, the switch SW3 is turned on to couple the second terminal B to the ground terminal GND and thus establish the power path P3, so that the inductor L is charged with the inductor current IL increasing at a slope equal to VIN/L. When the inductor current IL increases to a level IDC, the switch SW3 is turned off and the switch SW1 is turned on, thereby switching the second terminal B to the power output terminal 26 and establishing the power path P1. As a result, power is delivered via the power path P1 to the power output terminal 26, and the inductor current IL decreases at a slope equal to (VOA−VIN)/L. When the output voltage VOA reaches a preset value, the switch SW1 is turned off and the switch SW2 is turned on, so as to switch the second terminal B to the power output terminal 28 and establish the power path P2, and therefore, power is delivered via the power path P2 to the power output terminal 28 and the inductor current IL decreases at a slope equal to (VOB−VIN)/L. When the output voltage VOB at the power output terminal 28 increases to a preset value, the switch SW2 is turned off and the switch SW4 is turned on, so that the second terminal B is switched to the first terminal A, thereby establishing the power path P4, the inductor current IL becomes a freewheeling current. Till now a cycle is completed.

Figure 7:
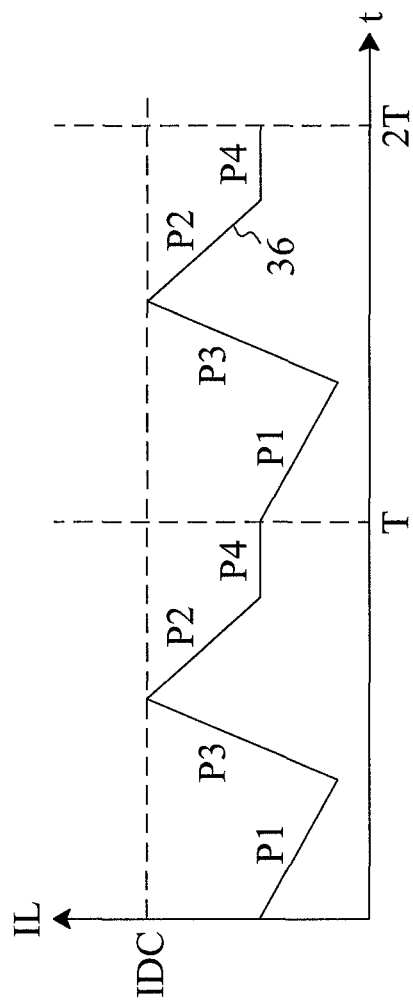
FIG. 7 is a diagram to illustrate a second control method according to the present invention, for the power converter of FIG. 3 to provide two boost outputs.

FIG. 7 is a diagram to illustrate another control method for the power outputs 26 and 28 of the SIDO power converter 20 both, to provide two boost outputs, in which waveform 36 represents an inductor current IL. At first, the switch SW1 is turned on to couple the second terminal B to the power output terminal 26 to establish the power path P1, and deliver power to the power output terminal 26. At this time, the inductor current IL decreases at a slope equal to (VOA−VIN)/L. When the output voltage VOA increases to a preset value, the switch SW1 is turned off and the switch SW3 is turned on, so as to switch the second terminal B to the ground terminal GND and establish the power path P3 to charge the inductor L with the inductor current IL increasing at a slope equal to VIN/L. When the inductor current IL reaches a level IDC, the switch SW3 is turned off and the switch SW2 is turned on, thereby switching the second terminal B to the power output terminal 28 and establishing the power path P2 by which power is delivered to the power output terminal 28, with the inductor current IL decreasing at a slope equal to (VOB−VIN)/L. When the output voltage VOB at the power output terminal 28 increases to a preset value, the switch SW2 is turned off and the switch SW4 is turned on, so as to switch the second terminal B to the first terminal A and establish the power path P4, thereby having the inductor current IL to be a freewheeling current. Till now a cycle is completed.

Figure 8:
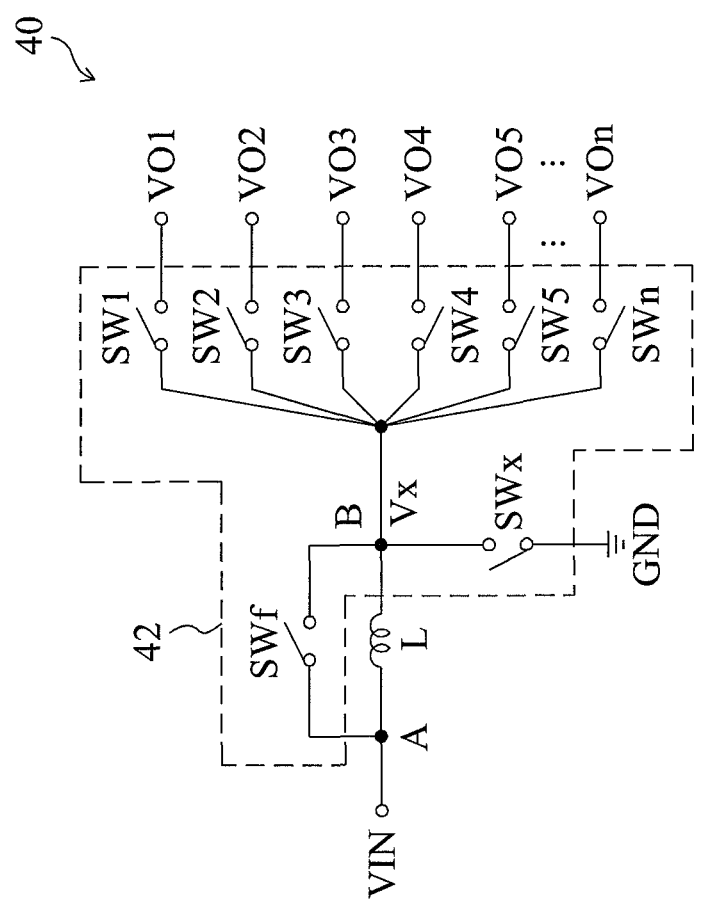
FIG. 8 is a circuit diagram of a SIMO power converter according to the present invention.

A power converter according to the present invention is easy to expand to have more outputs. As shown in FIG. 8, a single-inductor multiple-output (SIMO) power converter 40 has a same configuration as that of FIG. 3, but a switching circuit 42 having more switches SW1-SWn in addition to switches SWf and SWx, to provide more output voltages VO1-VOn. By switching the switches SWf, SW1-SWn, and SWx, the switching circuit 42 switches the second terminal B of the inductor L to either of the power input terminal VIN, power output terminals VO1-VOn, and a ground terminal GND, to establish power paths.

Figure 9:
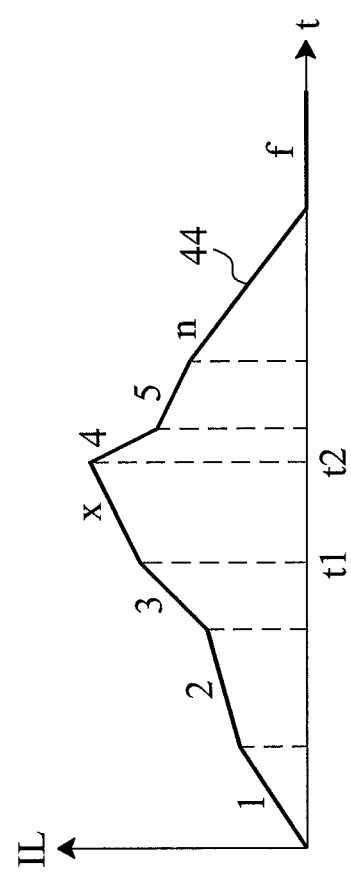
FIG. 9 is a diagram to illustrate a control method according to the present invention, for the power converter of FIG. 8 to provide multiple buck outputs and multiple boost outputs.

FIG. 9 is a diagram to illustrate a control method for the SIMO power converter 40 to provide multiple buck outputs and multiple boost outputs, in which waveform 44 represents an inductor current IL. In this embodiment, the power output terminals VO1, VO2, and VO3 provide buck outputs and the others VO4-VOn provide boost outputs. At first, the switch SW1 is turned on to couple the second terminal B to the power output terminal VO1 for power delivery to the power output terminal VO1 via a power path from the power input terminal VIN through the inductor L, and the inductor current increases. When the output voltage at the power output terminal VO1 reaches a preset value, the switch SW1 is turned off, and the switch SW2 is turned on to switch the second terminal B to the power output terminal VO2, for power delivery to the power output terminal VO2. The inductor current continues increasing. When the output voltage at the power output terminal VO2 reaches a preset value, the switch SW2 is turned off, and the switch SW3 is turned on to switch the second terminal B to the power output terminal VO3, for power delivery to the power output terminal VO3. The inductor current still continues increasing. When the output voltage at the power output terminal VO3 reaches a preset value, the switch SW3 is turned off, and the switch SWx is turned on to switch the second terminal B to the ground terminal GND to charge the inductor L with the inductor current IL increasing at a slope equal to VIN/L, as indicated between time t1 and time t2 in FIG. 9. When the inductor current IL reaches a preset value, the switch SWx is turned off, and the switch SW4 is turned on to switch the second terminal B to the power output terminal VO4 for power delivery to the power output terminal VO4. The inductor current begins decreasing. When the output voltage at the power output terminal VO4 reaches a preset value, the switch SW4 is turned off, and the switch SW5 is turned on to switch the second terminal B to the power output terminal VO5 for power delivery to the power output terminal VO5. The inductor current continues decreasing. When the output voltage at the power output terminal VO5 reaches a preset value, the second terminal B is switched to the next power output terminal for power delivery thereto. In a similar manner, the second terminal B is switched sequentially to the other power output terminals until the output voltage at the last power output terminal VOn reaches a preset value. Then, the second terminal B is switched to the first terminal A so that the inductor current IL becomes a freewheeling current, and a cycle is completed till now.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A single-inductor multiple-output power converter, comprising:
   an inductor having a first terminal and a second terminal, the first terminal coupled to a power input terminal receiving a direct-current (DC) input voltage;
   a first switch coupled between the first and second terminals of the inductor, to be turned on for the inductor to become a closed loop to remain a freewheeling current therein;
   a second switch coupled between the second terminal of the inductor and a ground terminal;
   a third switch coupled between the second terminal of the inductor and a first power output terminal; and
   a fourth switch coupled between the second terminal of the inductor and a second power output terminal;
   wherein the second terminal of the inductor is switched between the first terminal of the inductor, the ground terminal, the first power output terminal, and the second power output terminal by controlling the four switches to establish each of four power paths for once in a cycle, thereby converting the DC input voltage to a first DC output voltage and a second DC output voltage at the first and second power output terminals, respectively;
   wherein each of the four power paths includes only a respective one of the four switches;
   wherein the closed loop is established when only the first switch is on.

2. A control method for a single-inductor multiple-output power converter which includes an inductor having a first terminal and a second terminal, the control method comprising:
   A.) receiving a direct-current (DC) input voltage by the first terminal of the inductor;
   B.) switching the second terminal of the inductor to a ground terminal to establish a first power path;
   C.) switching the second terminal of the inductor to a first power output terminal to establish a second power path when an inductor current in the inductor increases to a first preset value;
   D.) switching the second terminal of the inductor to a second power output terminal to establish a third power path when a first DC output voltage at the first power output terminal increases to a second preset value; and
   E.) switching the second terminal of the inductor to the first terminal of the inductor to establish a fourth power path when a second DC output voltage at the second power output terminal increases to a third preset value, for the inductor to become a closed loop to remain a freewheeling current therein;
   wherein the steps B to E are performed one by one in a cycle by controlling four switches, thereby converting the DC input voltage to the first and second DC output voltages at the first and second power output terminals, respectively;
   wherein each of the four power paths includes only a respective one of the four switches;
   wherein the closed loop is established when only one of the four switches is on.

3. A control method for a single-inductor multiple-output power converter which includes an inductor having a first terminal and a second terminal, the control method comprising:
   A.) receiving a direct-current (DC) input voltage by the first terminal of the inductor;
   B.) switching the second terminal of the inductor to a first power output terminal to establish a first power path;

C.) switching the second terminal of the inductor to a ground terminal to establish a second power path when a first DC output voltage at the first power output terminal increases to a first preset value;

D.) switching the second terminal of the inductor to a second power output terminal to establish a third power path when an inductor current in the inductor increases to a second preset value; and E.) switching the second terminal of the inductor to the first terminal of the inductor to establish a fourth power path when a second DC output voltage at the second power output terminal increases to a third preset value, for the inductor to become a closed loop to remain a freewheeling current therein;

wherein the steps B to E are performed one by one in a cycle by controlling four switches, thereby converting the DC input voltage to the first and second DC output voltages at the first and second power output terminals, respectively;

wherein each of the four power paths includes only a respective one of the four switches;

wherein the closed loop is established when only one of the four switches is on.

4. A single-inductor multiple-output power converter, comprising:

an inductor having a first terminal and a second terminal, the first terminal coupled to a power input terminal receiving a direct-current (DC) input voltage; and a switching circuit coupled to the first and second terminals of the inductor, a ground terminal, and a plurality of power output terminals, switching the second terminal of the inductor between the first terminal of the inductor, the ground terminal, and the plurality of power output terminals by controlling a plurality of switches to establish each of a plurality of power paths for once in a cycle, thereby converting the DC input voltage to a plurality of DC output voltages at the plurality of power output terminals, respectively;

wherein each of the power paths includes only a respective one of the switches;

wherein the inductor becomes a closed loop to remain a freewheeling current therein when only one of the switches is on to connect the second terminal of the inductor to the first terminal of the inductor;

wherein a number of the switches is more than a number of the power output terminals by two.

5. The power converter of claim 4, wherein the switches comprises:

a first switch coupled between the first and second terminals of the inductor;

a second switch coupled between the second terminal of the inductor and the ground terminal;

a plurality of third switches, each of which is coupled between the second terminal of the inductor and a respective one of the plurality of power output terminals.

6. A control method for a single-inductor multiple-output power converter which includes an inductor having a first terminal and a second terminal, the control method comprising:

A.) receiving a direct-current (DC) input voltage by the first terminal of the inductor;

B.) switching the second terminal of the inductor sequentially to at least a buck output terminal to establish at least a first power path;

C.) switching the second terminal of the inductor to a ground terminal to establish a second power path;

D.) switching the second terminal of the inductor sequentially to at least a boost output terminal to establish at least a third power path when an inductor current in the inductor increases to a preset value; and E.) switching the second terminal of the inductor to the first terminal of the inductor to establish a fourth power path, for the inductor to become a closed loop to remain a freewheeling current therein;

wherein the steps B to E are performed one by one in a cycle by controlling a plurality of switches, thereby converting the DC input voltage to a plurality of DC output voltages at the at least a buck output terminal and the at least a boost output terminal, respectively;

wherein each of the power paths includes only a respective one of the switches;

wherein a number of the switches is more than a number of the boost and buck output terminals by two;

wherein the closed loop is established when only one of the switches is on.

7. A control method for a single-inductor multiple-output power converter which includes an inductor having a first terminal and a second terminal, the control method comprising:

A.) receiving a direct-current (DC) input voltage by the first terminal of the inductor;

B.) switching the second terminal of the inductor to a ground terminal to establish a first power path;

C.) switching the second terminal of the inductor sequentially to a plurality of power output terminals to establish a plurality of second power paths; and D.) switching the second terminal of the inductor to the first terminal of the inductor to establish a third power path, for the inductor to become a closed loop to remain a freewheeling current therein;

wherein the steps B to D are performed one by one in a cycle by controlling a plurality of switches, thereby converting the DC input voltage to a plurality of DC output voltages at the plurality of power output terminals, respectively;

wherein a number of the switches is more than a number of the power output terminals by two;

wherein the closed loop is established when only one of the switches is on.

* * * * *